United States Patent Office 2,699,150
Patented Jan. 11, 1955

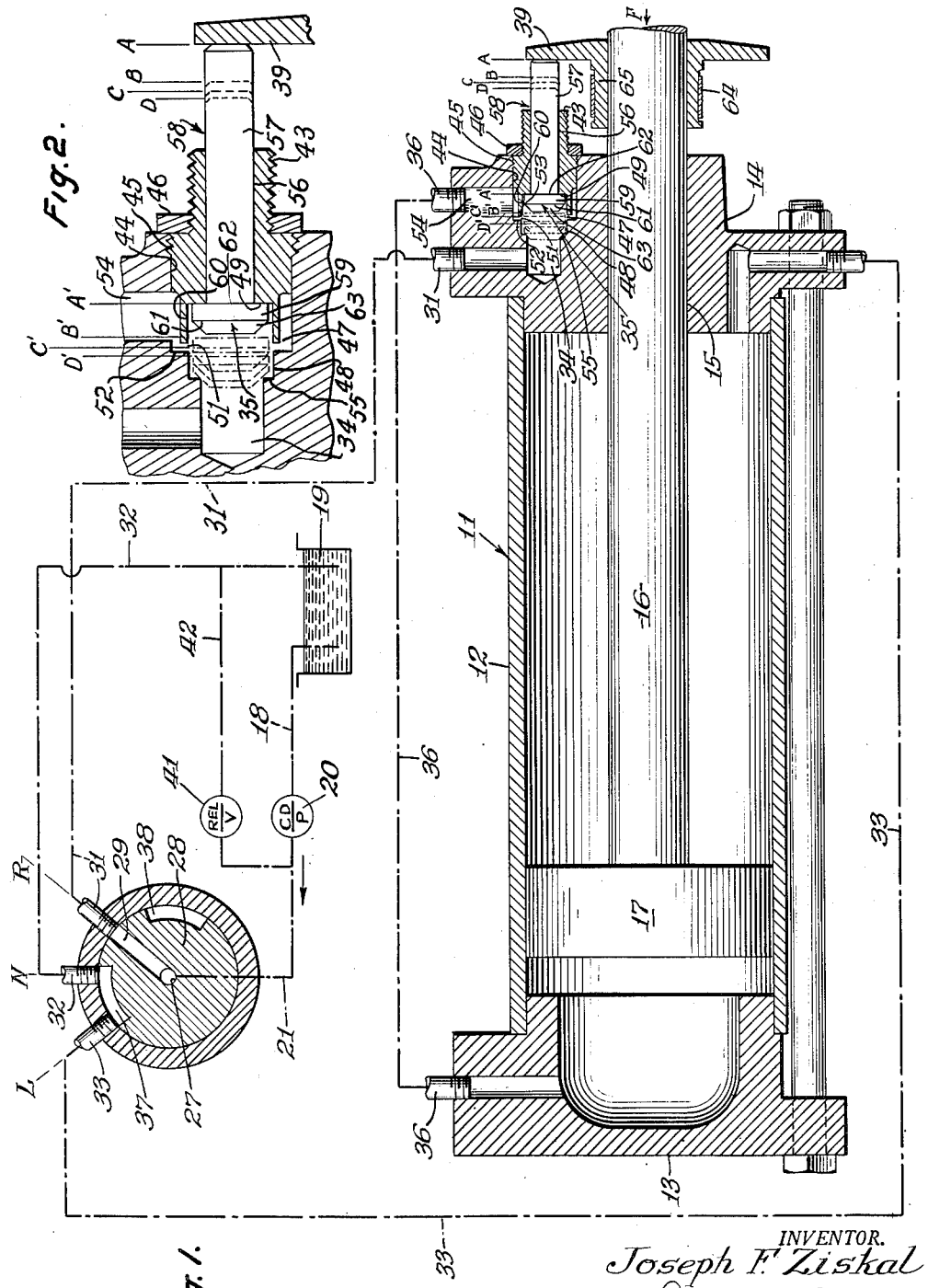

2,699,150

MECHANICAL AND FLUID PRESSURE CONTROLLED VALVE

Joseph F. Ziskal, Brookfield, Ill., assignor to International Harvester Company, a corporation of New Jersey Application December 9, 1950, Serial No. 200,012

4 Claims. (Cl. 121—38)

This invention concerns valve structures employable in a fluid supply and discharge line communicative with a pulsator chamber of a hydraulic ram and operable to close for preventing discharge of fluid from the chamber to determine a stop position for a piston or the like therein responsively to the valve being operated by the ram piston into a closing-initiating position pursuant to which the valve is closed by fluid pressure, and the valve being openable when subjected to the pressure of fluid tending to flow reversely therethrough for moving the ram piston oppositely, this invention primarily relating to a dash-pot structure associated with the valve to control the speed of its movement when being opened under fluid pressure.

This invention is a modification of an hydraulic ram-controlling valve shown in my abandoned co-pending application, Serial No. 98,222 filed June 10, 1949, for Hydraulic Power-Lift and Movement Limiting Control Therefor, continued in application Serial No. 272,335, filed February 19, 1952, and now issued into Patent No. 2,606,532. The general object of this invention is the provision in combination with a valve of this character of a dash-pot chamber portion or bore into which the head of a poppet type valve element is retracted when the valve is opened by fluid tending to flow therepast into an end of the ram cylinder whereby the valve element is adapted to open at a controlled speed to assure that such element will not reach the limit of its retractive movement prior to withdrawal therefrom of a valve closing initiating member from the range of movement of the valve element which member is constrained for movement with the ram piston.

A further object of the invention is the provision of a simply constructable dash-pot chamber readily incorporatable into mechanical combination with the controlled valve.

These and more specific desirable objects will be better understood from the ensuing description, the appended claims, and the annexed drawings, wherein:

Fig. 1 is a partially diagrammatic figure illustrating the preferred form of the invention in conjunction with a hydraulic circuit including a hydraulic ram having an end wall constituting a casing for the valve and dash-pot structure; and Fig. 2 is a fragmentary view taken in section, showing the valve and associated elements of Fig. 1 to an enlarged scale.

With continued reference to the drawing there is shown a hydraulic ram 11 comprising a cylinder 12 with end walls 13 and 14. The end wall 14 contains a bearing opening 15 for a piston rod 16 which is connected with a piston 17 reciprocally in the cylinder 12.

The hydraulic ram 11 is operated by fluid under pressure obtained from a constant delivery pump 20 which draws fluid through a conduit 18 from a reservoir 19. Fluid is discharged from the pump through a conduit 21 into a bore 27 of an oscillatable valve core 28. A radial passage 29 of the valve core communicates with the passage 27 and is selectively registerable with conduits 31, 32 and 33. The valve core 28 is illustrated with the passage 29 registering with the conduit 31 which leads into the rod end 14 of the ram cylinder through a passage 34, thence through a valve 35, passage 54 and a conduit 36 into the head end of the ram cylinder. Fluid thus discharged into the head end of the ram cylinder causes the piston 17 to move rightward, attendant to discharging fluid from the rod end of such cylinder by way of the conduit 33, a valve core recess 37 and the conduit 32 back to the reservoir 19.

When the piston has moved rightward as far as desired, the operator will rock the valve core 28 counter-clockwise from position R to a neutral position N, wherein the radial passage 29 registers with the conduit 32. During neutral setting of the valve core the pump 20 can circulate fluid at low pressure in a circuit including the conduit 21, core passages 27 and 29 and conduit 32 back to the reservoir 19.

When it is desired to cause movement of the ram piston 17 leftward, the valve core 28 will be manually rocked to position L wherein the radial passage 29 registers with the conduit 33, and wherein an arcuate recess 38 of the valve core establishes communication between the conduits 31 and 32. This setting of the valve will cause fluid delivered by the pump 20 to flow through the conduit 21, core passages 27 and 29 and conduit 33 into the right end of the ram cylinder 12. As the piston 17 moves leftward it forces fluid from the head end of the cylinder through the conduit 36, valve 35, passage 34, conduit 31, valve core recess 38 and the conduit 32 back to the reservoir. Interruption in this leftward movement of the piston 17, so as to cause it to stop a predetermined distance from the head end 13 of the cylinder, is attainable automatically by a valve-closing-initiating element 39 on the piston rod 16 operating in combination with the valve 35. Such interruption in the leftward movement of the piston is accomplished by causing the valve 35 to close so that further discharge of fluid from the left end of the ram cylinder is precluded. When this occurs fluid can no longer enter the right end of the cylinder through the conduit 33 wherefor fluid at an increased pressure will be by-passed from the outlet of the pump 20 to the reservoir 19 through a relief valve 41, conduit 42 and the conduit 32 until the operator manually resets the valve core 28 to the neutral position. Setting of the valve core in neutral prevents flow of fluid to or from either of the conduits 31 and 33 and thereby hydraulically locks the ram piston in the position where its leftward movement was interrupted by the closing of the valve 35.

Operation of the valve 35 will be better understood after a detailed description thereof which ensues. The cylinder end wall 14 constitutes a casing of the valve 35. A part of this casing consists of a bushing 43 inserted into a recess 44 where it is maintained in assembly by intermeshing threads 45 and a lock nut 46. A chamber 47 within this valve casing includes a valve-shrouding portion 48 in the form of a bore in the part 14 and a dash-pot portion 49 in the form of a bore in the part 43. An annular port 51 is arranged coaxially with the bores 48 and 49 between the contiguously opposed inner ends 52 and 53 thereof. This port communicates between the valve casing chamber 47 and the casing passage 54 which communicates with the conduit 36.

Passage 34 communicates with the valve-shrouding bore 48 at a position spaced axially of such bore from the port 51, and a valve seat 55 is interposed between the bore 48 and the passage 34 coaxially with such bore.

A bearing opening 56 formed in the bushing 43 extends through such bushing and hence through the valve casing axially from the dash-pot bore 49. A stem 57 of a valve plunger 58 is piloted in the bearing opening 56. A head 59 of the valve plunger is disposed within the casing chamber 47 where it is movable axially within the bores 48 and 49 to alternatively occupy positions respectively therein. A breather passage 60 exists for the dash-pot bore 49 because of radial clearance between the plunger head 59 and the inner periphery of the bore 49. This valve head has a leading edge 61 and a trailing edge 62. The trailing edge 62 coincides with a trailing end of such head whereas a leading end of the head, which is conical, is designated 63 and conforms to the valve seat 55 to cooperate therewith in closing the valve when seated thereon and thereby preclude the flow of fluid serially through the port 51, the valve shrouding bore 48 and the passage 34.

The valve-closing-initiating element 39 for initiating closing movement of the valve 35 is adjustable lengthwise of the piston rod 16 and is frictionally maintained at any adjusted position upon the piston rod by a split ring 64 releasably tightenable in any conventional manner upon axially extending fingers 65 of said element.

In explaining the utility and operation of the valve 35 in conjunction with the settable trip element 39 therefor, it will be presumed that the ram 11 is installed in an environment where a force is continuously imposed endwise upon the piston rod 16 in the direction of the arrow F. A force of this kind is conventionally obtained when a hydraulic ram is installed upon a ground-tillage vehicle between a frame of such vehicle and a tillage tool adjustable by the ram between an earth-working position and a transport position wherein the tool is lifted from the earth. While in the transport position gravitational force upon the tool would impose the force F upon the ram. The operator of such vehicle will frequently raise the tool to transport position when making turns at the ends of field crop rows, and when subsequently lowering the tool to the earth-working position the operator will desire that the tool be allowed to penetrate the earth a depth determinable by the distance the ram piston is permitted to move leftward.

With the valve core 28 set, as illustrated in the drawing, fluid is being introduced into the left end of the ram cylinder for moving the piston 17 rightward which would move the earth-working tool into the transport position. Subsequent movement of the valve core to position N would hydraulically lock the piston 17 in a rightward position maintaining the tool in the transport position. Eventual lowering of the tool the desired depth into the earth is accomplished by manually shifting the valve core to position L whereupon the gravitational force (represented by arrow F) upon the tool supplemented by the pressure of fluid entering the cylinder through the conduit 33 causes the piston 17 to commence its leftward movement. Fluid thus discharged from the cylinder flows through the conduit 36, thence through the valve 35, passage 34, conduit 31, valve core recess 38, and conduit 32 to the reservoir 19. During this discharge of fluid from the left end of the ram cylinder, the valve plunger 58 will be fully retracted into position A'A with the trailing end 62 of the valve plunger head at the bottom of the dash-pot bore 49, a position attained by the pressure of fluid upon the left end of the valve plunger when fluid flowed through the valve 35 attendant to previous movement of the piston to the right. When the valve-closing-initiating element 39 moves with the cylinder piston to position A this element will contact the outer end of the valve stem 57 whereby the valve plunger 58 is thereafter moved leftward with the piston. When the outer end of the valve stem arrives at position B the leading edge 61 of the valve head will arrive at a valve-throttling position B' causing a substantial diminution in the pressure of fluid in the passage 34 with respect to the pressure in the passage 54 and port 51. Fluid from the port 51 flowing through the breather passage 60 (existing because of clearance between the circumference of the head 59 and the inner periphery bore 49) enters that portion of the dash-pot bore 49 to the right of the head trailing edge 62 and thereby presses against the right end of the valve head to quickly move the valve plunger leftward, projecting the head 59 into the bore 48 into the valve closing position D' where the conical valve head end 63 will rest against the valve seat 55. At this time the flow of fluid past the valve 35 from the left end of the ram cylinder 12 is stopped wherefore further leftward movement of the ram piston is precluded. The pressure of fluid entering the right end of the ram cylinder through the conduit 33 will rise and this rise in fluid pressure will be reflected back to the pump outlet and into the relief valve 41 which will by-pass fluid from the constant delivery pump into the reservoir 19. The operator will detect that the ram piston has arrived at its limit of movement whereupon he will manually return the valve core 28 to the neutral position wherein the core passage 29 registers with the conduit 32 leading to the reservoir 19.

When the trailing edge 62 of the valve head 59 reached the throttling position B' the left face of the valve-closing-initiating member 39 arrived at the position B and remained substantially at position B during the closing movement of the valve plunger to position D'D caused by the fluid pressure differential on the two ends of the valve head 59. This would leave a space BD between the member 39 and the right end of the valve stem 57. Later, when it is desired to move the ram piston rightward the valve core 28 will be rotated to place the radial passage 29 in registry with the conduit 31. Fluid from the pump is thus directed through the conduit 31 and valve passage 34 against the left end of the valve plunger 58. The pressure of this fluid will cause rightward movement of the valve plunger into the position C'C; i. e., where the trailing edge 62 of the valve head is at position C' and the right end of the stem is at position C which is spaced from the valve-closing-initating member 39 a distance CB. When the valve plunger reaches this position, retardation in its rightward movement occurs because of the resistance to further movement interposed by the fluid trapped in the dash-pot bore 49. Continued pressure on the left end of the valve plunger by fluid flowing into the passage 34 from the conduit 31 will slowly move the valve plunger rightward while the fluid in the dash-pot bore 49 escapes through the breather passage 60. During this retarded movement of the valve plunger rightward, the fluid flowing past the valve 35 through the port 51 and passage 54 will continue through the conduit 36 into the left end of the ram cylinder and cause movement of the piston to the right whereby the valve-closing-initiating element 39 is moved to the right at sufficient speed to avoid being pressed against and having its setting upon the piston rod 16 disturbed by the valve plunger stem 57. When the piston 17 is moved the desired distance to the right the operator will rock the valve core 28 back to the neutral position N for causing the piston to be hydraulically locked in a position corresponding to transport position for tools or the like which would be controlled by the ram.

Having thus described a preferred form of the invention with the view of clearly and concisely illustrating same, I claim:

1. In a hydraulic ram and control therefor, a cylinder; fluid passage means communicating with an end of said cylinder; a plunger reciprocal in said cylinder, said plunger being advanced endwise in the cylinder pursuant to introduction of fluid into the cylinder through said passage means, and said plunger being operable to exhaust fluid from the cylinder through said passage means attendant to forcible retractive movement of the plunger in the cylinder; a control valve structure upon the opposite end of the cylinder, said control valve structure including a casing containing an axially extending chamber having a valve-shrouding portion spaced axially of such chamber from a dash-pot portion thereof, a port communicating laterally into such chamber at a position between said chamber portions, a passage communicating with the valve-shrouding chamber portion at a position spaced axially of the chamber from said port, and a bearing opening extending through the casing axially from the dash-pot chamber portion, said passage, said valve-shrouding portion of the chamber, and said port being included in said fluid passage means and arranged serially therein in the order named in the upstream direction of exhaust flow through said passage means; a valve plunger including a head in said chamber and also including an operating stem piloted in said bearing opening and having an outer end portion projecting outwardly therethrough, said valve stem being freely endwise movable in said bearing opening, said plunger head being advanceable into the valve-shrouding chamber portion to occupy a passage-closing position preventing flow of fluid from the port serially through the valve-shrouding chamber portion and passage, said plunger head being retractible into the dash-pot chamber portion to provide communication through the valve-shrouding chamber portion between said passage and port; valve stem abutment means movable with and frictionally held against movement relatively to the ram plunger outwardly from said opposite end of the cylinder and abuttably against the outer end of the valve stem to push it inwardly of the valve casing bearing opening and thereby advance the retracted valve plunger head toward the valve-shrouding chamber pursuant to the final portion of predetermined retractive movement of the ram plunger and the attendant exhaust of fluid through said passage means; and means providing for limited communication between the dash-pot chamber portion and said port to limit the rate of retraction of the head into the dash-pot chamber portion whereby fluid entering the one end of the cylinder through said passage means can advance the plunger and valve stem abutment means at a rate to avoid the stem of the retracting valve plunger overtaking and abutting the valve stem abutment means.

2. In a hydraulic ram and control therefor, a cylinder having a rod end wall with outer and inner sides respectively and an opposite head end wall; a plunger reciprocal in the cylinder and having a rod portion projecting outwardly through said rod end wall, the plunger being advanceable toward the rod end wall and retractible toward the head end wall; fluid passage means leading through the rod end wall and communicative with the interior of the cylinder; a control valve structure upon said rod end wall and including therein a chamber extending axially of the cylinder, said chamber having a valve-shrouding portion disposed toward the inner side of such wall, a dash-pot portion spaced axially from the valve shrouding portion toward the outer side of such wall, a port communicating laterally into such chamber at a position between the two chamber portions, a passage communicating with the valve-shrouding chamber portion at a position spaced axially of the chamber from the port, and a bearing opening extending axially from the dash-pot chamber portion outwardly through the outer side of such head end wall, said passage, said valve-shrouding portion of the chamber and said port being included in said passage means and being serially arranged therein in the order named in an upstream direction with reference to the flow of fluid therethrough into the cylinder attendant to retraction of the plunger in the cylinder; a valve plunger including a head in said chamber and also including an operating stem piloted in said bearing opening, wherein said stem is freely endwise movable, the plunger head being of less diameter than the valve-shrouding chamber portion to provide radial clearance with respect thereto when the head is in such chamber portion, the plunger head having a leading edge and a trailing edge spaced from the leading edge toward the dash-pot chamber portion, the plunger being retractible axially of the chamber by the pressure of fluid directed through said passage into the valve-shrouding chamber portion to place the plunger in a free floating setting wherein the head of such plunger is projected into the dash-pot chamber portion and the leading edge of such head is withdrawn from the shrouding chamber portion to facilitate communication between the passage and port through the shrouding chamber portion, the plunger being thereafter advanceable into a throttling position wherein said leading edge approaches the shrouding chamber portion to throttle communication between the port and the shrouding chamber portion; breather passage means communicating between the dash-pot chamber portion and said port while the plunger head is at least partially within the dash-pot chamber portion to create a pressure differential across the plunger head while in said throttling position urging it advancively into the shrouding chamber portion responsively to a condition of fluid pressure at the port exceeding fluid pressure in said passage and to thereby preclude the flow of fluid serially through the port, the shrouding chamber portion and the passage in the order named; valve stem abutment means on the ram plunger rod exteriorly of the rod end wall and displaceable axially thereof when subjected to an inordinate impact force axially thereof, said abutment means being abuttable against the outer end of the valve stem to push it inwardly of its bearing opening and thereby advance the retracted valve plunger into the throttling position attendant to retraction of the ram plunger, and said valve plunger having an axial length to dispose its trailing edge in the dash-pot chamber portion while such plunger is in the throttling position whereby the dash-pot chamber is operable to limit the retraction speed of the valve plunger under the pressure of fluid flowing reversely through said passage means attendant to advance of the ram plunger to prevent the retractive valve plunger stem overtaking and abutting the valve stem abutting means on the advancing ram plunger rod.

3. In a hydraulic ram and control therefor, a cylinder having a rod end wall with outer and inner sides respectively and an opposite head end wall; a plunger reciprocal in the cylinder and having a rod portion projecting outwardly through said rod end wall, the plunger being advanceable toward the rod end wall and retractible toward the head end wall; fluid passage means leading through the rod end wall and communicative with the interior of the cylinder; a control valve structure upon said rod end wall and including therein a chamber including a valve-shrouding bore and a dash-pot bore which are in coaxial endwise contiguity and extend axially of the ram cylinder, said rod end wall also including a port communicating laterally into such chamber at a position between said bores, a passage communicating with the valve-shrouding bore at a position spaced axially thereof from said port, a valve seat coaxially within the valve-shrouding bore between the passage and said port, and a bearing opening extending axially from the dash-port bore outwardly through the outer side of said head end wall, said passage, said valve shrouding bore together with the valve seat therein and said port being included in said passage means and being serially arranged therein in the order named in an upstream direction with reference to the flow of fluid through such passage means into the cylinder attendant to retraction of the ram plunger in the cylinder; a valve plunger including a head in said chamber and also including a stem piloted in said bearing opening wherein said stem is freely endwise movable, said plunger head being movable oppositely endwise for alternately occupying positions respectively in said bores, said plunger having a retractive setting while the head occupies the dash-pot bore and being adapted to maintain such setting while being freely movable endwise, the plunger head having a leading edge disposed toward the valve-shrouding bore while such head is in the dash-pot bore and a trailing edge disposed toward the dash-pot bore while such head is in the shrouding bore, said plunger being advanceable from the dash-pot bore occupying position toward the valve-shrouding bore into a throttling position wherein said leading edge is disposed in proximity to the shrouding bore to cooperate therewith in throttling communication between the port and such shrouding bore, there being clearance between the plunger head and the sides of the dash-pot bore to form therewith a breather passage communicating between said port and the dash-pot bore and thereby create a fluid pressure differential across the plunger head while in said throttling position urging the valve plunger advancively into a valve-closing position in the shrouding bore responsively to a condition of fluid pressure at the port exceeding fluid pressure in said passage, there being clearance between the plunger head and the sides of the shrouding bore to continue such throttling during advance of the head into such bore and the valve plunger head being operable when in such valve-closing position to abut the said valve seat and thus preclude the flow of fluid serially through the port, the shrouding bore and said passage in the order named; valve stem abutment means on the ram plunger rod exteriorly of the rod end wall and displaceable axially thereof when subjected to an inordinate impact force axially thereof, said abutment means being abuttable against the outer end of the valve stem to push it inwardly of its bearing opening and thereby advance the retracted valve plunger into the throttling position attendant to retraction of the ram plunger, and said valve plunger having an axial length to dispose its trailing edge in the dash-pot chamber portion while such plunger is in the throttling position whereby the dash-pot chamber is operable to limit the retraction speed of the valve plunger under the pressure of fluid flowing reversely through said passage means attendant to advance of the ram plunger to prevent the retracting valve plunger stem overtaking and abutting the valve stem abutting means on the advancing ram plunger rod.

4. The combination set forth in claim 3 wherein the trailing edge of the plunger head is spaced such as distance from the leading edge thereof that the trailing edge will be disposed within the dash-pot bore while the leading edge is in said throttling position and that such trailing edge will be advanced from the dash-pot bore and into position for uncovering said port while the valve head is in the valve-closing position.

References Cited in the file of this patent

UNITED STATES PATENTS

| | | |
|---|---|---|
| 204,687 | Shlaudeman | June 11, 1878 |
| 852,802 | Sears | May 7, 1907 |
| 1,029,464 | Ruwell | June 11, 1912 |
| 1,136,840 | Shaw | Apr. 20, 1915 |
| 1,322,938 | Parker | Nov. 25, 1919 |
| 1,466,171 | Jacobsen | Aug. 28, 1923 |
| 1,693,177 | Hodgart | Nov. 27, 1928 |
| 2,092,818 | Tennant | Sept. 14, 1937 |
| 2,308,347 | Asselin | Jan. 12, 1943 |
| 2,383,689 | Silver | Aug. 28, 1945 |
| 2,420,896 | Meyers | May 20, 1947 |
| 2,541,395 | Wilson | Feb. 13, 1951 |
| 2,547,861 | Fletcher | Apr. 3, 1951 |